US012811852B2

(12) United States Patent
Huang et al.

(10) Patent No.: US 12,811,852 B2
(45) Date of Patent: Nov. 24, 2026

(54) SYSTEMS AND METHODS FOR NETWORK EXPOSURE FUNCTION PACKET FLOW DETECTION SERVICE

(71) Applicant: Verizon Patent and Licensing Inc., Basking Ridge, NJ (US)

(72) Inventors: Ye Huang, San Ramon, CA (US); Alexander Fadeev, Summit, NJ (US); Shanthala Kuravangi-Thammaiah, Keller, TX (US); Ce Xu, Campbell, CA (US); Louis Chan-Lizardo, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 57 days.

(21) Appl. No.: 18/920,631

(22) Filed: Oct. 18, 2024

(65) Prior Publication Data

US 2026/0113240 A1 Apr. 23, 2026

(51) Int. Cl.

*H04L 41/0894* (2022.01)
*H04L 43/02* (2022.01)
*H04L 47/20* (2022.01)

(52) U.S. Cl.

CPC .......... *H04L 41/0894* (2022.05); *H04L 43/02* (2013.01); *H04L 47/20* (2013.01)

(58) Field of Classification Search

CPC . H04L 41/0894; H04L 65/80; H04L 12/1407; H04L 47/24; H04L 63/1416; H04L 43/02; H04L 47/20

See application file for complete search history.

(56) References Cited

U.S. PATENT DOCUMENTS

| | | | | |
|---|---|---|---|---|
| 2020/0187106 | A1* | 6/2020 | Salkintzis | H04W 4/60 |
| 2021/0314266 | A1* | 10/2021 | Li | H04L 47/2441 |
| 2022/0141662 | A1* | 5/2022 | Liao | H04W 12/08 726/1 |
| 2023/0080830 | A1* | 3/2023 | Fernandez Alonso | H04W 4/50 455/422.1 |
| 2023/0093193 | A1* | 3/2023 | Mathison | H04W 76/10 709/227 |
| 2024/0236823 | A1* | 7/2024 | Suh | H04L 41/0893 |
| 2024/0430710 | A1* | 12/2024 | Ke | H04W 36/28 |
| 2025/0081028 | A1* | 3/2025 | Huang | H04W 28/18 |
| 2025/0168281 | A1* | 5/2025 | Lee | H04L 61/5007 |
| 2025/0212047 | A1* | 6/2025 | Alasti | H04W 24/08 |
| 2025/0227549 | A1* | 7/2025 | Ke | H04W 28/0268 |
| 2026/0067223 | A1* | 3/2026 | Wen | H04L 43/0894 |

* cited by examiner

*Primary Examiner* — Tonia L Dollinger
*Assistant Examiner* — Linh T. Nguyen

(57) ABSTRACT

A device may include a processor configured to receive a request to implement a rule to create a data flow in a core network for a user equipment (UE) device, wherein the rule specifies that a data flow with a particular requirement is to be created when a particular Packet Flow Detection (PFD) pattern is detected for the UE device and add the rule to a subscription record associated with the UE device. The processor may be further configured to receive an indication that the PFD pattern has been detected for the UE device; and send a policy authorization to a Policy Control Function (PCF), associated with the UE device, to create the data flow, in response to receiving the indication that the PFD pattern has been detected for the UE device.

20 Claims, 10 Drawing Sheets

SYSTEMS AND METHODS FOR NETWORK EXPOSURE FUNCTION PACKET FLOW DETECTION SERVICE

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network across different types of devices or access points. Managing different wireless communication services over time across different devices may pose various difficulties.

DETAILED DESCRIPTION OF PREFERRED EMBODIMENTS

Figure 1:
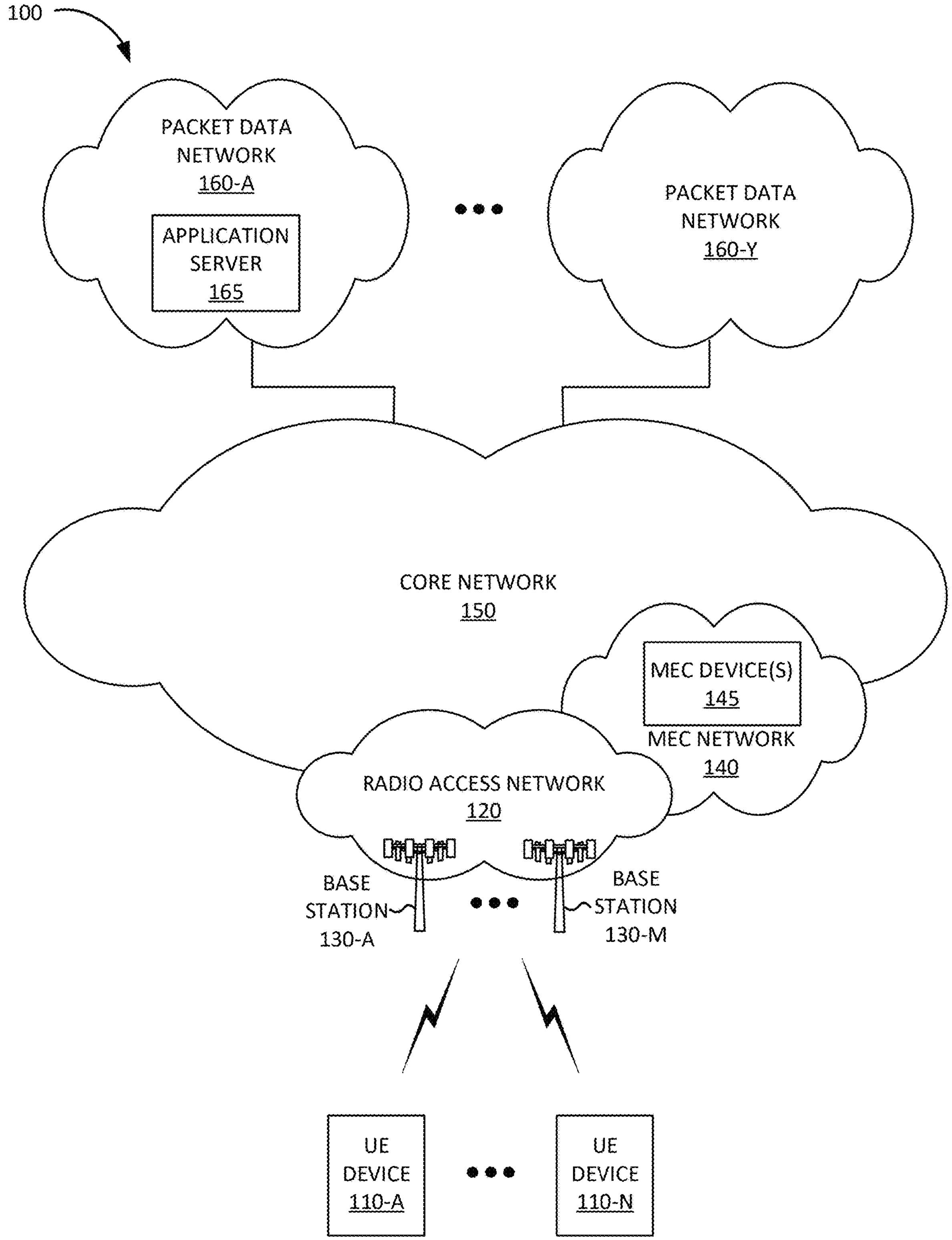
FIG. 1 illustrates an environment according to an implementation described herein.

The following detailed description refers to the accompanying drawings. The same reference numbers in different drawings identify the same or similar elements.

Providers of wireless communication services operate radio access networks (RANs) that include base stations. The base stations enable cellular wireless communication devices (e.g., smart phones, etc.), referred to as user equipment (UE) devices (also herein referred to as UEs), to connect to networks and obtain services via the provider's core network, such as a Fourth Generation (4G) core network, a Fifth Generation (5G) core network, and/or other next generation networks as defined by the 3$^{rd}$ Generation Partnership Project (3GPP). 5G coverage may be provided using 5G base stations, referred to as gNodeBs, implementing the 5G New Radio (NR) air interface. In order to establish a communication session, a UE device may establish a Protocol Data Unit (PDU) session in the core network, via the RAN. The PDU session may enable the UE device to communicate with another network via the RAN and core networks. The UE device may then establish one or more data flows in the PDU session. Each data flow may be associated with a Quality of Service (QoS) and/or other types of service requirements and may also be referred to as a "QoS data flow" or a "QoS flow."

An important feature of a core network is a Network Exposure Function (NEF) that exposes an Application Programming Interface (API) to devices outside the core network for requesting particular services within the core network. For example, an application server may, via an Application Function (AF) in the core network, access the API of the NEF to provision a rule in the core network to apply a policy to a data flow associated with the application server. As an example, the application server may dynamically request to assign packets associated with an application identifier (ID) to a first QoS class during a first time period and to a second QoS class during a second time period. As another example, the application server may assign a first type of data session to a first type of charging record and a second type of data session to a second type of charging record for charges associated with the data sessions.

An AF may send a policy rule for a data flow to the NEF and the NEF may send the policy rule for the data flow to a Policy Control Function (PCF) and/or to a Session Management Function (SMF) in the core network in an attempt to apply the policy rule to the data flow. However, such an approach may suffer from several problems, such as the AF needing to make multiple API calls for a UE device, the AF needing to make separate API calls for each UE device, the NEF not being able to identify a PCF associated with a data session, the AF not being able to apply a policy rule dynamically, and/or other types of inefficiencies.

Implementations described herein relate to systems and methods for NEF PFD service. An AF may request to implement a rule to create a data flow with specified requirements for a UE device when a PFD pattern is detected for the UE device. The AF may request to implement the rule with an API call to a NEF in a core network and the NEF, together with other components of the core network, may implement the rule.

For example, the NEF may be configured to receive a request from an AF to implement the rule to create the data flow with the specified requirements for the UE device when the PFD pattern is detected for the UE device and send an instruction to a Unified Data Management (UDM) function to add the rule to the subscription record associated with the UE device. The instruction may further include an instruction to send a notification to the NEF when the PFD pattern is detected for the UE device.

The NEF may be further configured to receive an indication from an SMF that the PFD pattern has been detected for the UE device and send, in response, a policy authorization to a PCF, associated with the UE device, to create the data flow, in response to receiving an indication that the PFD has been detected for the UE device. The received indication may include information identifying PCF associated with the UE device. The NEF may be further configured to receive a notification from the PCF that the data flow has been created for the UE device and send a notification to the AF that the data flow has been created for the UE device.

The PFD pattern may include an application identifier (ID), a packet data pattern associated with an application, a Data Network Name (DNN), and/or another type of pattern that may be used to detect a packet flow. In some implementations, the NEF may send an instruction to a UDM function to perform deep packet inspection to identify a pattern associated with the PFD. Furthermore, a PFD rule may specify multiple PFD patterns to be monitored for a UE device. A PDU session associated with UE device may include multiple data flows and different data flows may be associated with different PFD patterns and/or different requirements.

In some implementations, the rule may be applied to a group of UE devices assigned to a user device group. The requirement for the data flow to be created based on the rule may include a Quality of Service (QoS) requirement. Additionally, or alternatively, the requirement for the data flow to be created may include a throughput requirement, a jitter requirement, a security requirement, and/or another type of service requirement. In some implementations, the requirement may further include a routing requirement, such as, for example, to route the data flow to a Multi-Access Edge Computing (MEC) network, to route the data flow to a particular with a DNN, and/or another type of routing requirement.

In some implementations, the NEF may be further configured to receive a request from the AF to terminate the data flow if a termination criterion is detected and to send an instruction to the PCF to terminate the data flow if the termination criterion in detected, in response to receiving the request from the AF to terminate the data flow if the termination criterion is detected.

In other implementations, the NEF may perform a push operation to provide the rule to create the data flow to the SMF. For example, the NEF may receive a request from the AF to implement the rule to create the data flow with the specified requirements for the UE device when the PFD pattern is detected for the UE device. The NEF may identify the SMF associated with the UE device (e.g., based on information received from the AF, based on a query sent to the UDM/UDR, based on a query sent to an Access and Mobility Management Function (AMF), etc.) and send an instruction to the SMF to send a notification to the NEF when the PFD pattern is detected for the UE device.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a RAN 120 that includes base stations 130-A to 130-M (referred to herein collectively as "base stations 130" and individually as "base station 130"), a Multi-Access Edge Computing (MEC) network 140, a core network 150, and packet data networks (PDNs) 160-A to 160-Y (referred to herein collectively as "PDNs 160" and individually as "PDN 160").

UE device 110 may include any mobile device with cellular wireless communication functionality. UE device 110 may include a handheld wireless communication device (e.g., a mobile phone, a smart phone, a tablet device, etc.); a wearable computer device (e.g., a head-mounted display computer device, a wristwatch computer device, etc.); a laptop computer, a tablet computer, a portable gaming system, and/or another type of portable computer; a Fixed Wireless Access (FWA) device; and/or any other type of mobile computer device with cellular wireless communication capabilities. In some implementations, UE device 110 may communicate using machine-to-machine (M2M) communication, such as Machine Type Communication (MTC), and/or another type of M2M communication for IoT applications.

RAN 120 may include base stations 130 and be managed by a provider of wireless communication services. RAN 120 may enable UE devices 110 to connect to core network 150 via base stations 130 using cellular wireless signals. For example, RAN 120 may include one or more central units (CUs), distributed units (DUs), and/or Radio Units (RUs) (not shown in FIG. 1) that enable and manage connections from RUs to core network 150. RAN 120 may include features associated with a Long-Term Evolution (LTE) Advanced (LTE-A) network and/or a 5G network or other next generation network, such as features for or associated with management of 5G NR base stations; carrier aggregation; advanced or massive Multiple-Input Multiple Output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Base station 130 may include a 5G NR base station (e.g., a gNodeB) and/or a 4G LTE base station (e.g., an eNodeB). Base stations 130 may include devices and/or components configured to enable cellular wireless communication with UE devices 110. For example, base stations 130 may include a radio frequency (RF) transceiver configured to communicate with UE devices 110 using a 5G NR air interface using a 5G NR protocol stack, a 4G LTE air interface using a 4G LTE protocol stack, and/or using another type of cellular air interface.

MEC network 140 may be associated with RAN 120 and may provide MEC services for UE devices 110 attached to base stations 130. MEC network 140 may be in proximity to base stations 130 from a geographic and network topology perspective, thus enabling low latency services to be provided to UE devices 110. As an example, MEC network 140 may be located on the same site as base station 130. As another example, MEC network 140 may be geographically closer to one of base stations 130 and reachable via fewer network hops and/or fewer switches, than other macro cell base stations 130.

MEC network 140 may include one or more MEC devices 145. MEC devices 145 may provide MEC services to UE devices 110. A MEC service may include, for example, a low-latency microservice associated with a particular application, a microservice associated with a virtualized network function (VNF) of core network 150, a cloud computing service, such as cache storage service, artificial intelligence (AI) accelerator service, machine learning service, an image processing service, a data compression service, a locally centralized gaming service, a Graphics Processing Units (GPUs) and/or other types of hardware accelerator service, and/or other types of cloud computing services.

Core network 150 may be managed by the provider of cellular wireless communication services and may manage communication sessions of subscribers connecting to core network 150 via RAN 120. For example, core network 150 may establish an IP connection between UE devices 110 and PDN 160. The components of core network 150 may be implemented as dedicated hardware components and/or as Virtual Network Functions (VNFs) implemented on top of a common shared physical infrastructure using Software Defined Networking (SDN). For example, an SDN controller may implement one or more of the components of core network 150 using an adapter implementing a VNF virtual machine, a Cloud-Native Network Function (CNF) container, an event driven serverless architecture, and/or another type of SDN architecture. The common shared physical infrastructure may be implemented using one or more devices 300 described below with reference to FIG. 3 in a cloud computing center associated with core network 150. Additionally, or alternatively, at least some of the components of core network 150 may be implemented using MEC devices 145 in MEC network 140. Exemplary components that may be included in core network 150 are described below with reference to FIG. 2.

PDNs 160-A to 160-Y may each be associated with a DNN in 5G, and/or an Access Point Name (APN) in 4G. UE device 110 may request a connection to PDN 160 using a DNN or an APN. For example, UE device 110 may request a data flow connection to an application server 165 (shown in PDN 160-A). PDN 160 may include, and/or be connected to, a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks. PDN 160 may include application server 165. Application server 165 may include one or more computer devices that host one or more applications and/or other types of services used by UE device 110. Core network 150 may establish a communication session between UE device 110 and application server 165 via RAN 120.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
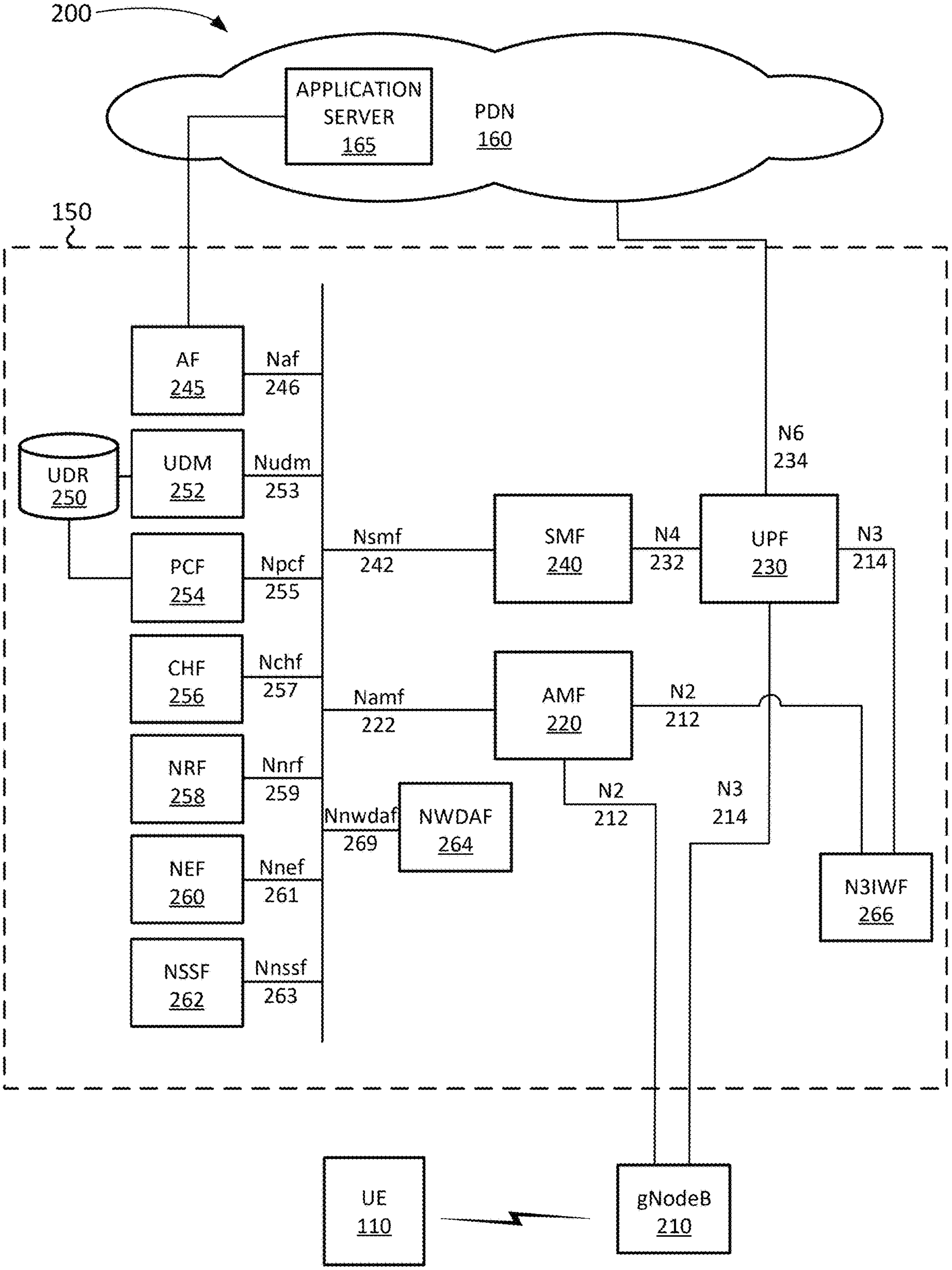
FIG. 2 illustrates exemplary components of a Fifth Generation (5G) core network according to an implementation described herein.

FIG. 2 is a diagram illustrating exemplary components of an environment 200 that includes gNodeB 210, core network 150, and PDN 160. In environment 200, core network 150 includes a 5G core network. gNodeB 210 may be implemented by base station 130. Core network 150 may include AMF 220, a User Plane Function (UPF) 230, an SMF 240, an AF 245, a Unified Data Repository (UDR) 250, a UDM 252, a PCF 254, a Charging Function (CHF) 256, a Network Repository Function (NRF) 258, a NEF 260, a Network Slice Selection Function (NSSF) 262, a Networks Data Analytics Function (NWDAF) 264, and a Non-3GPP Inter-Working Function (N3IWF) 266. While FIG. 2 depicts a single AMF 220, UPF 230, SMF 240, AF 245, UDR 250, UDM 252, PCF 254, CHF 256, NRF 258, NEF 260, NSSF 262, NWDAF 264, and N3IWF 266 for illustration purposes, in practice, core network 150 may include multiple AMFs 220, UPFs 230, SMFs 240, AFs 250, UDRs 250, UDMs 252, PCFs 254, CHFs 256, NRFs 258, NEFs 260, NSSFs 262, NWDAFs 264, and/or N3IWFs 266.

AMF 220 may perform registration management, connection management, reachability management, mobility management, lawful intercepts, session management messages transport between UE device 110 and SMF 240, access authentication and authorization, location services management, support non-3GPP access networks, and/or other types of management processes. AMF 220 may be accessible by other function nodes via an Namf interface 222. AMF 220 may communicate with gNodeB 210 via an N2 interface 212.

UPF 230 may maintain an anchor point for intra/inter-Radio Access Technology (RAT) mobility, maintain an external PDU point of interconnect to a particular PDN 160, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may receive instructions from SMF 240 to monitor packet flows for a PFD pattern for UE device 110 and send a notification to SMF 240 when the PFD pattern is detected. In some implementations, UPF 230 may be instructed to, and in response, perform deep packet inspection to monitor for the PFD pattern for UE device 110. UPF 230 may communicate with gNodeB 210 using an N3 interface 214, communicate with SMF 240 using an N4 interface 232, and connect to PDN 160 using an N6 interface 234.

SMF 240 may perform session establishment, session modification, and/or session release, apply policies received from PCF 254 to data flows, perform IP address allocation and management, perform Dynamic Host Configuration Protocol (DHCP) functions, perform selection and control of UPF 230, configure traffic steering at UPF 230 to guide the traffic to the correct destinations, perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data.

SMF 240 may receive a subscription request from NEF 260 to notify NEF 260 when a PFD pattern is detected for UE device 110 and may instruct UPF 230 associated with UE device 110 to monitor for the PFD pattern. SMF 240 may notify NEF 260 when the PFD pattern is detected for UE device 110. The notification may include information identifying a particular PCF 254 associated with the detected PFD pattern. Furthermore, SMF 240 may receive an instruction from PCF 254 to create a data flow for packets associated with a PFD pattern and apply one or more requirements to the created data flow, such as a QoS requirement, a throughput requirement, a jitter requirement, a security requirement, and/or another type of requirement. In some implementations, the requirement may include a routing requirement, such as a requirement to route the data flow to a specific destination, such as MEC 140, PDN 160 associated with a particular DNN, and/or another type of destination. SMF 240 may send an indication to NEF 260 that the data flow has been created. SMF 240 may be accessible via an Nsmf interface 242.

AF 245 may provide services associated with a particular application, such as, for example, an application associated with application server 165, an application for accessing NEF 260, an application for interacting with a policy framework for policy control, and/or other types of applications. AF 245 may access an API associated with NEF 260 and use the API to request to implement a rule to create a data flow for UE device 110 with specified requirements when a PFD pattern is detected for UE device 110 or for a group of UE devices 110. AF 245 may further receive notifications from NEF 260 via the API indicating that the PFD pattern has been detected and/or that the requested data flow has been created for a particular UE device 110. AF 245 may be accessible via an Naf interface 246, also referred to as an NG5 interface. In some implementations, AF 245 may correspond to, or interface with application server 165.

UDR 250 may store subscription information for UE devices 110. UDM 252 may function as an interface to UDR 250, maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support Short Message Service (SMS) message delivery, support lawful intercept functionality, and/or perform other processes associated with managing user data. Furthermore, UDM 252 may store, in UDR 250, an instruction to monitor for a PFD pattern for UE device 110. The instruction may be provided to SMF 240 when SMF 240 requests subscription information for UE device 110. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may receive an authorization from NEF 260 to create a data flow for UE device 110 with specified requirements and may instruct SMF 240 associated with UE device 110 to create the data flow. Furthermore, PCF 254 may instruct other network functions (NFs) to perform actions with respect to the created data flow. For example, PCF 254 may instruct NWDAF 264 to collect values for a set of Key Performance Indicators (KPIs) associated with the data flow and report the collected KPI values to NEF 260 and/or instruct CHF 256 to generate a particular type of charging record for the data flow. PCF 254 may be accessible via Npcf interface 255. CHF 256 may perform charging and/or billing functions for core network 150. In some implementations, CHF 256 may generate a particular charging record, based on a charging requirement, for a data flow associated with UE device 110. CHF 256 may be accessible via Nchf interface 257.

NRF 258 may support a service discovery function and maintain profiles of available NF instances and their supported services. NRF 258 may be accessible via an Nnrf interface 259. NEF 260 may expose capabilities and events to other NFs, including third party NFs, AFs, edge computing NFs, and/or other types of NFs. NEF 260 may secure provisioning of information from external applications to core network 150, translate information between core network 150 and devices/networks external to core network 150, and/or perform other types of network exposure functions. NEF 260 may receive a request from AF 245 to implement a rule to create a data flow with specified requirements for UE device 110 when a PFD pattern is detected for UE device 110 and may store an instruction to implement the rule in a subscription record, associated with UE device 110, in UDR 250. In other implementations, NEF 260 may identify an SMF 240 associated with UE device 110 and send an instruction directly to SMF 240 to monitor for the PFD pattern and send an indication to NEF 260 if the PFD pattern is detected for UE device 110. NEF 260 may receive an indication from SMF 240 that the PFD pattern has been detected for UE device 110 along with a PCF ID, and send an instruction to PCF 254, associated with the PCF ID, to authorize the creation of the data flow in response. NEF 260 may report the detection of the PFD pattern and/or creation of the data flow to AF 245. NEF 260 may be accessible via Nnef interface 261.

NSSF 262 may select a set of network slice instances to serve a particular UE device 110, determine network slice selection assistance information (NSSAI) or a Single-NSSAI (S-NSSAI), determine a particular AMF 220 to serve a particular UE device 110, and/or perform other types of processing associated with network slice selection or management. NSSF 262 may be accessible via Nnssf interface 263. NSSF 262 may provide a list of allowed slices to AMF 220.

NWDAF 268 may collect analytics information associated with radio access network 120 and/or core network 150. NWDAF 268 may collect KPI values for different locations for applications running on particular network slices and generate historical performance data based on the collected KPI values. NWDAF 268 may collect the KPI values for a created data flow from UE device 110 and/or from UPF 230 via SMF 240 and report the collected KPI values to NEF 260. N3IWF 274 may interconnect to a non-3GPP access device, such as, for example, a WiFi Access Point. N3IWF 274 may facilitate handovers for UE device 110 between radio access network 120 and the non-3GPP access device. N3IWF 274 may be accessible via Nn3iwf interface 275.

Although FIG. 2 shows exemplary components of core network 150, in other implementations, core network 150 may include fewer components, different components, differently arranged components, or additional components than depicted in FIG. 2. Additionally, or alternatively, one or more components of core network 150 may perform functions described as being performed by one or more other components of core network 150.

Figure 3:
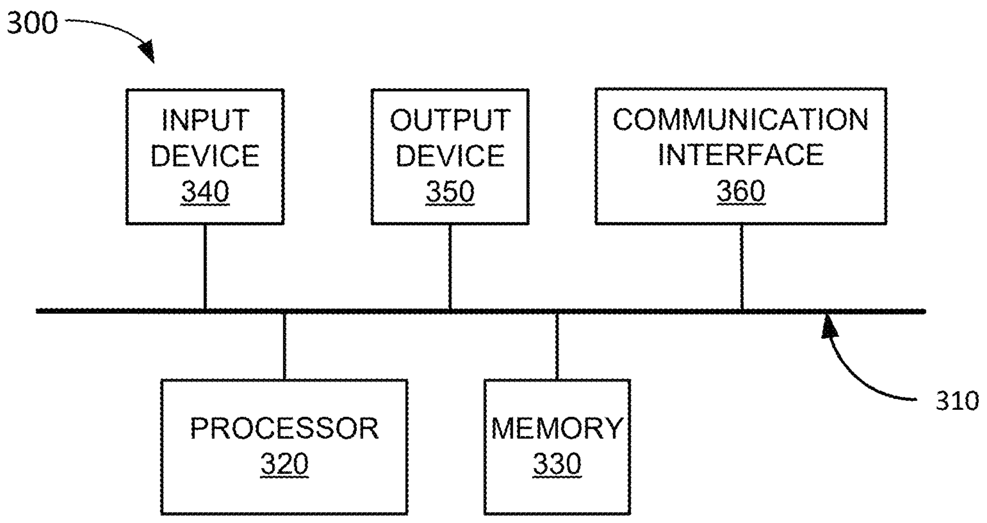
FIG. 3 illustrates exemplary components of a device that may be included in an environment according to an implementation described herein.

FIG. 3 is a diagram illustrating example components of a device 300 according to an implementation described herein. The components of FIG. 1 and/or FIG. 2 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some implementations, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some implementations, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a NEF PFD service. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
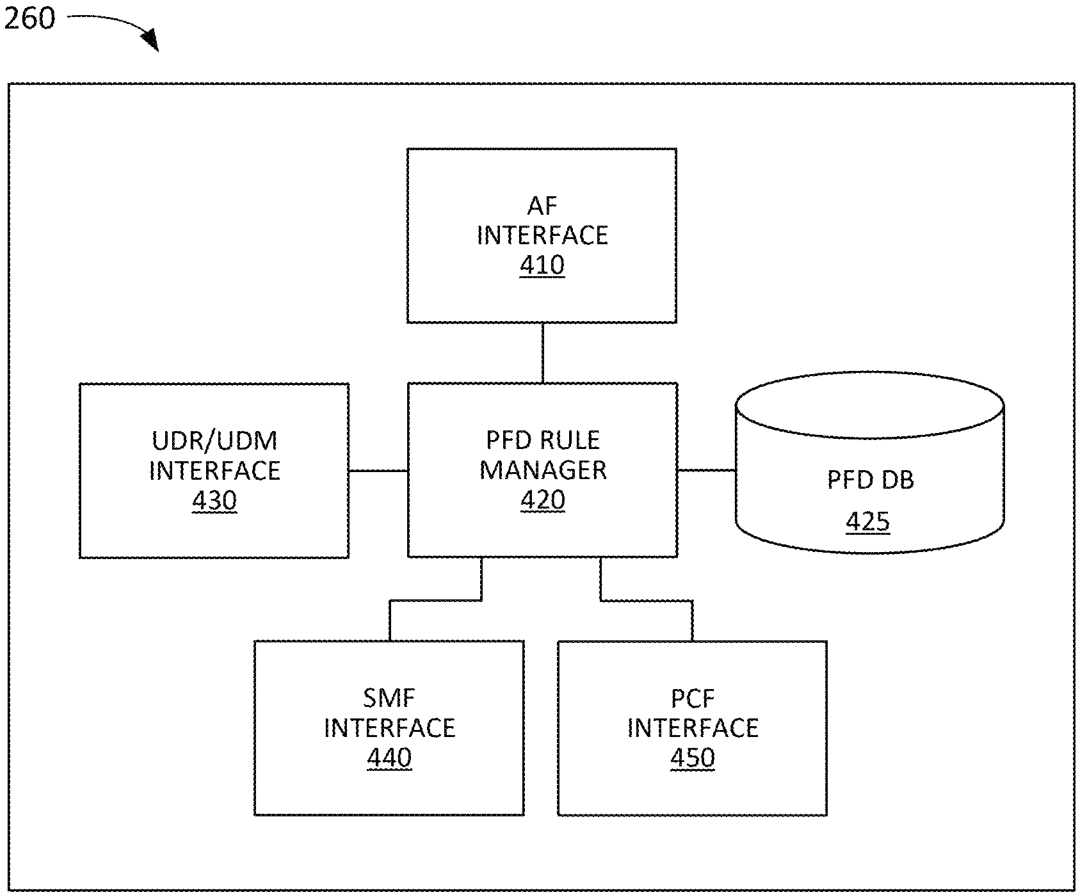
FIG. 4 illustrates exemplary components of a Network Exposure Function (NEF) according to an implementation described herein.

FIG. 4 illustrates exemplary components of NEF 260. The components of NEF 260 may be implemented, for example, via processor 320 executing instructions from memory 330. For example, one or more components of NEF 260 may correspond to the structure of processor 320 together with instructions in memory 330 for implementing the functionality of the component. Alternatively, some or all of the components of NEF 260 may be implemented via hardwired circuitry. For example, one or more components of NEF 260 may correspond to the structure of some or all of an ASIC, FPGA, and/or another type of integrated circuit. As shown in FIG. 4, NEF 260 may include an AF interface 410, a PFD rule manager 420, a PFD database (DB) 425, a UDR/UDM interface 430, an SMF interface 440, and a PCF interface 450.

AF interface 410 may be configured to communicate with AF 245. For example, AF interface 410 may be configured to send messages to AF 245 via Naf interface 246 and/or may expose Nnef interface 261 to AF 245. AF interface 410 may receive a request from AF 245 to implement a rule to create a data flow with specified requirements for UE device 110 when a PFD pattern is detected for UE device 110, or for a group of UE devices 110 associated with a device group. Additionally, in some implementations, AF interface 410 may receive, from AF 245, a termination criterion for terminating a data flow created using the rule. Furthermore, AF interface 410 may report, to AF 245 and in response to detecting the PFD pattern, that the PFD pattern associated with the rule for UE device 110 has been detected, and/or may report that a data flow with the specified requirements has been created for UE device 110.

PFD rule manager 420 may create, manage, update, and/or delete PFD rules requested by AFs 245. PFD rule manager 420 may store information relating to PFD rules in PFD DB 425. Exemplary information that may be stored in PFD DB 425 is described below with reference to FIG. 5. PFD rule manager 420 may receive information identifying a device group, and/or a list of UE devices 110, for which the PFD rule is to be created, the PFD pattern associated with the PFD rule, and one or more requirement for a data flow to be created when the PFD pattern is detected for UE device 110 included in the device group. PFD rule manager 420 may send an instruction to UDM 252 to add the rule to the subscription record, in UDR 250, of each UE device 110 included in the device group. In other implementations, PFD rule manager 420 may may identify an SMF 240 associated with UE device 110 and send an instruction directly to SMF 240 to monitor for the PFD pattern and to send an indication to NEF 260 if the PFD pattern is detected for UE device 110. PFD rule manager 420 may receive an indication, via SMF interface 440, that the PFD pattern has been detected for UE device 110 by UPF 230. The indication may include a PCF ID for PCF 254 associated with UE device 110. PFD rule manager 420 may send a create policy authorization to PCF 254, associated with the PCF ID, to create a data flow with the specified requirements. Furthermore, a PFD rule may specify multiple PFD patterns to be monitored for UE device 110 and/or UE device 110 may be associated with multiple PFD rules. A PDU session associated with UE device may include multiple data flows and different data flows may be associated with different PFD patterns and/or different requirements.

In some implementations, PFD rule manager 420 may receive a termination criterion for terminating a data flow associated with the PFD rule. PFD rule manager 420 may include the termination criterion in the create policy authorization sent to PCF 254. PCF 254 may instruct SMF 240 to monitor for the termination criterion and terminate the data flow if the termination criterion is detected.

UDR/UDM interface 430 may be configured to communicate with UDM 252 and/or UDR 250. For example, UDR/UDM interface 430 may send an instruction to UDM 252 to add a PFD rule to the subscription record (in UDR 250) of UE device 110. In other implementations, NEF 260 may access UDR 250 directly and add the PFD rule to the subscription record of UE device 110. SMF interface 440 may be configured to communicate with SMF 240. For example, SMF interface 440 may receive a notification from SMF 240 that a PFD pattern has been detected for UE device 110 and/or may receive an indication that a data flow has been created based on the detected PFD pattern. PCF interface 450 may be configured to communicate with PCF 254. For example, PCF interface 450 may be used to send a create policy authorization to PCF 254, to instruct SMF 240 create a data flow with the specified requirements for UE device 110.

Although FIG. 4 shows exemplary components of NEF 260, in other implementations, NEF 260 may include fewer components, different components, additional components, or differently arranged components than depicted in FIG. 4. Additionally, or alternatively, one or more components of NEF 260 may perform one or more tasks described as being performed by one or more other components of NEF 260.

Figure 5:
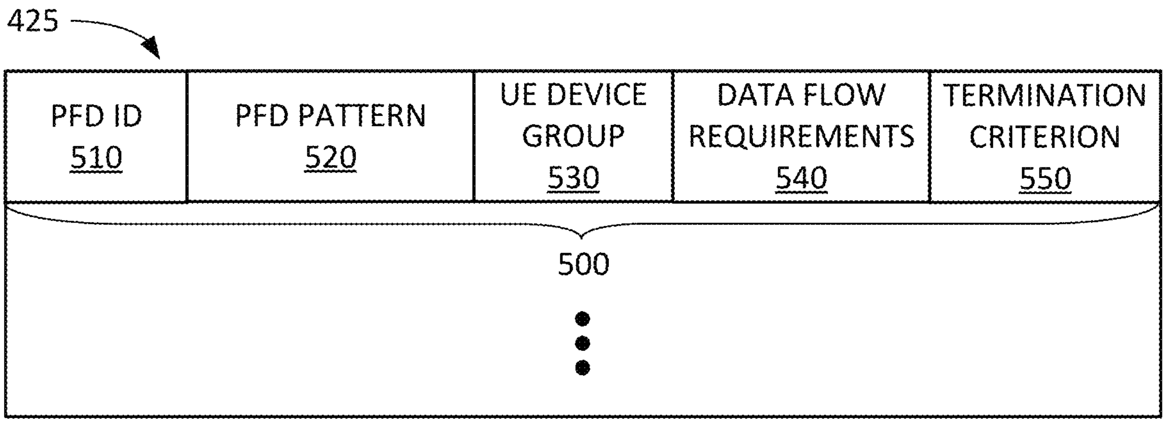
FIG. 5 illustrates exemplary components of a Packet Flow Detection (PFD) database (DB) according to an implementation described herein.

FIG. 5 illustrates exemplary components of PFD DB 425. As shown in FIG. 5, PFD DB 425 may include one or more PFD records 500. Each PFD record 500 may include information relating to a particular PFD rule. PFD record 500 may include a PFD ID field 510, a PFD pattern field 520, a UE device group field 530, a data flow requirements field 540, and a termination criterion field 550.

PFD ID field 510 may store an ID associated with a particular PFD rule. PFD pattern field 520 may store information identifying one or more PFD patterns associated with the particular PFD rule. A PFD pattern may include an application ID associated with an application, a packet size pattern associated with the application, a bit rate pattern associated with the application, a data pattern included in a packet associated with the application, a DNN and/or another type of destination ID associated with a packet, and/or another type of pattern that may be used to detect a packet flow.

UE device group field 530 may store information identifying a device group associated with the particular PFD rule, such as a device group ID, a subscription type, a device type, and/or other types of information that may be used to identify a group of UE devices 110. Additionally, or alternatively, UE device group field 530 may list a set of UE devices 110 to be included in the device group. Each listed UE device 110 may be identified using a Mobile Directory Number (MDN), an International Mobile Subscriber Identity (IMSI), a Mobile Station International Subscriber Directory Number (MSISDN), an International Mobile Equipment Identity (IMEI), and/or another type of UE device ID and/or subscription ID.

Data flow requirements field 540 may store one or more requirements for a data flow to be created based on the particular PFD rule. The one or more requirements include a QoS requirement, such as, for example, a QoS Class Identifier (QCI) to be assigned to the data flow (e.g., a 5G QCI (5QI), etc.), a priority level (e.g., an Allocation and Retention Priority (ARP) value, etc.), a Guaranteed Flow Bit Rate (GFBR) value, a Maximum Packet Loss Rate (MPLR) value; and/or other types of QoS requirements. Furthermore, the one or more requirements may include a throughput requirement, a latency requirement, a jitter (i.e., packet delay variation) requirement, a security requirement, a spending limit requirement, and/or another type of requirement. A security requirement may include a blacklist of UE devices 110 prevented from being included in the PFD rule, a white list of UE devices 110 allowed to be included in the PFD rule, an encryption requirement, a requirement to apply malware detection scheme to packets associated with the data flow, and/or another type of security requirement. A spending limit requirement may include a limit on maximum throughput, average throughput, latency, a total amount of data transferred, a duration of the data flow, and/or a limit on another parameter associated with the data flow.

Additionally, or alternatively, the one or more requirements may include a charging requirement and/or a charging requirement to be applied when a particular a charging condition is satisfied. The charging requirement may include generating a particular type of charging record for be generated for the data flow. The charging condition may include an average throughput value for the data flow, a maximum throughput value for the data flow, an average latency value for the data flow, a maximum latency value for the data flow, a jitter value for the data flow, a total amount of uplink and/or downlink data transmitted using the data flow, and/or another type of routing requirement.

Additionally, or alternatively, the one or more requirements may include a requirement to route the data flow to a particular destination and/or to route the data flow to a particular destination if a routing requirement is satisfied. The particular destination may include MEC network 140, a particular MEC device 145 in MEC network 140, a DNN associated with PDN 160, a particular application server 165 in PDN 160, and/or another type of destination. The routing requirement may include an average throughput value for the data flow, a maximum throughput value for the data flow, an average latency value for the data flow, a maximum latency value for the data flow, a jitter value for the data flow, a total amount of uplink and/or downlink data transmitted using the data flow, and/or another type of routing requirement.

Termination criterion field 550 may include a termination condition associated with the particular PFD rule. If the termination condition is detected, the created data flow may be terminated. The termination criterion may include, for example, a total amount of uplink and/or downlink data transferred, a duration of the data flow, detection of malware, detection of unauthorized content, and/or another type of termination criterion.

Although FIG. 5 shows exemplary components of PFD DB 425, in other implementations, PFD DB 425 may include fewer components, different components, additional components, or differently arranged components than depicted in FIG. 5.

Figure 6:
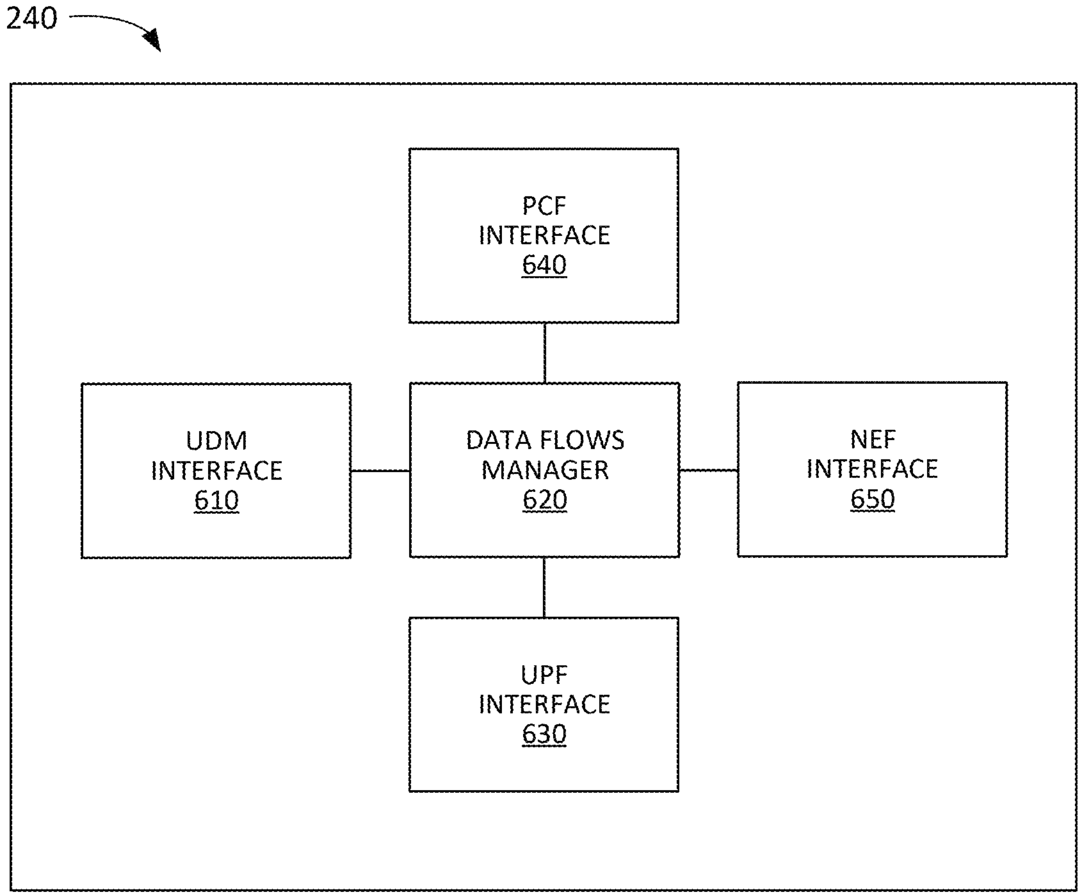
FIG. 6 illustrates exemplary components of a NEF according to an implementation described herein.

FIG. 6 illustrates exemplary components of SMF 240. The components of SMF 240 may be implemented, for example, via processor 320 executing instructions from memory 330. For example, one or more components of SMF 240 may correspond to the structure of processor 320 together with instructions in memory 330 for implementing the functionality of the component. Alternatively, some or all of the components of SMF 240 may be implemented via hard-wired circuitry. For example, one or more components of SMF 240 may correspond to the structure of some or all of an ASIC, FPGA, and/or another type of integrated circuit. As shown in FIG. 6, SMF 240 may include a UDM interface 610, a data flows manager 620, a UPF interface 630, an PCF interface 640, and a NEF interface 650.

UDM interface 610 may be configured to communicate with UDM 252. For example, UDM interface 610 may obtain requirements associated with a PFD rule for UE device 110 from UDM 252. Data flows manager 620 may manage data flows associated with a PFD rule. For example, data flows manager 620 may instruct UPF 230 to monitor for a PFD pattern and may receive a notification from UPF 230 if the PFD pattern is detected for UE device 110. Data flows manager 620 may notify NEF 260 that the PFD pattern has been detected for UE device 110. Furthermore, data flows manager 620 may receive an instruction from PCF 254 to create a data flow with one or more specified parameters and may instruct UPF 230 to create the data flow. Data flows manager 620 may then send a notification to NEF 260 indicating that the data flow has been created. In some implementations, data flows manager 620 may be instructed to monitor for a termination criterion and may instruct UPF 230 to monitor the data flow for the termination criterion and to terminate the data flow if the termination criterion is detected.

UPF interface 630 may be configured to communicate with UPF 230. For example, UPF interface 630 may send instructions to UPF 230 from data flows manager 620 and/or may receive notifications from UPF 230. PCF interface 640 may be configured to communicate with PCF 254. For example, PCF interface 640 may receive instructions from PCF 254 to create a data flow associated with one or more specified requirements. NEF interface 650 may be configured to communicate with NEF 260. For example, NEF interface 650 may send a notification to NEF 650 that a PFD pattern has been detected and/or that a data flow with the one or more specified requirements has been created.

Although FIG. 6 shows exemplary components of SMF 240, in other implementations, SMF 240 may include fewer components, different components, additional components, or differently arranged components than depicted in FIG. 6. Additionally, or alternatively, one or more components of SMF 240 may perform one or more tasks described as being performed by one or more other components of SMF 240.

Figure 7:
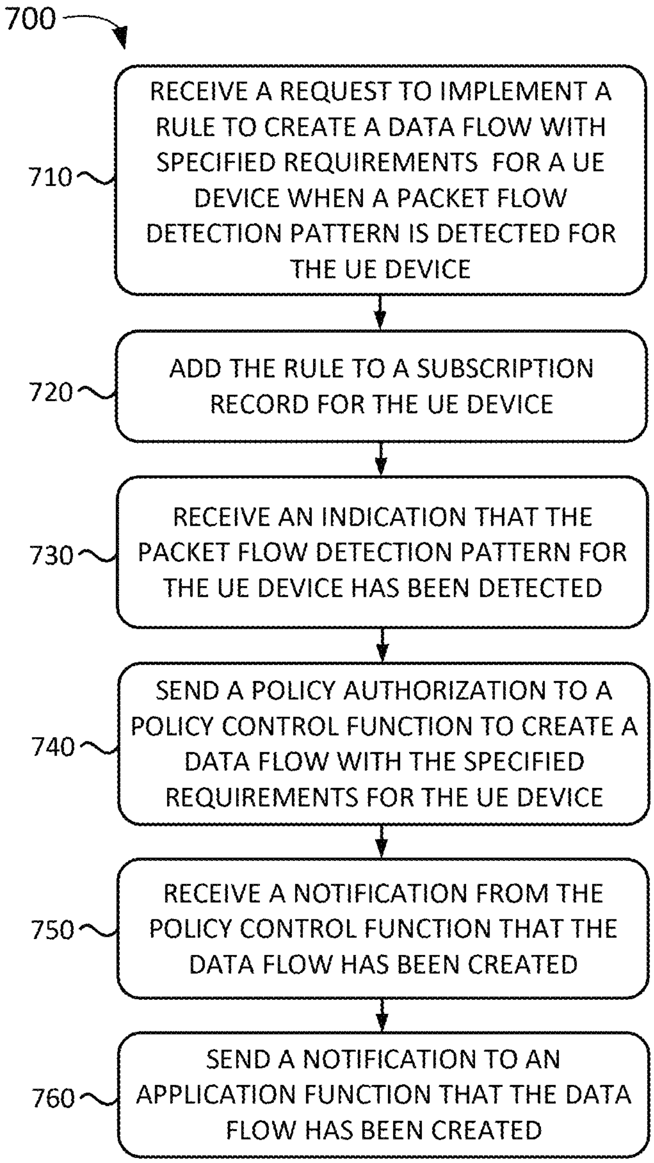
FIG. 7 illustrates a flowchart of a process for implementing a rule to create a data flow with specified requirements according to an implementation described herein.

FIG. 7 illustrates a flowchart of a process 700 for implementing a rule to create a data flow with specified requirements. In some implementations, process 700 of FIG. 7 may be performed by NEF 260. In other implementations, some or all of process 700 may be performed by another device or a group of devices separate from NEF 260.

As shown in FIG. 7, process 700 may include receiving a request to implement a rule to create a data flow with specified requirements for a UE device when a PFD pattern is detected for the UE device (block 710) and adding the rule to a subscription record for the UE device (block 720). For example, NEF 260 may receive a request from AF 245 to implement a PFD rule to create a data flow with one or more specified requirements if a PFD pattern is detected for one or more UE devices 110. The request may include information identifying a device group, and/or a list of UE devices 110, for which the PFD rule is to be created, the PFD pattern associated with the PFD rule, and one or more requirement for a data flow to be created when the PFD pattern is detected for UE device 110 included in the device group. NEF 260 may send an instruction to UDM 252 to add the rule to the subscription record in UDR 250 of each UE device 110 included in the device group. In other implementations, NEF 260 may identify an SMF 240 associated with UE device 110 (e.g., based on information received from AF 245, based on a query sent to UDM 252 and/or UDR 250, based on a query sent to AMF 220, etc.) and send an instruction directly to SMF 240 to monitor for the PFD pattern and to send an indication to NEF 260 if the PFD pattern is detected for UE device 110.

Process 700 may further include receiving an indication that the PFD pattern for the UE device has been detected (block 730) and sending a policy authorization to a PCF to create a data flow with the specified requirements for the UE device (block 740). For example, NEF 260 may receive an indication from SMF 240 that the PFD pattern has been detected for UE device 110 by UPF 230. The indication may include a PCF ID for PCF 254 associated with UE device 110. NEF 260 may send a create policy authorization, to PCF 254 associated with the PCF ID, to create a data flow with the specified requirements. In some implementations, NEF 260 may receive, from AF 245, a termination criterion for terminating a data flow associated with the PFD rule. NEF 260 may include the termination criterion in the create policy authorization sent to PCF 254.

Process 700 may further include receiving a notification from the PCF that the data flow has been created (block 750) and sending a notification to the AF that the data flow has been created (block 760). For example, NEF 260 may receive a notification from PCF 254 that the data flow has been created for UE device 110. In response, NEF 260 may send a notification to AF 245 that the data flow has been created for UE device 110.

Figure 8:
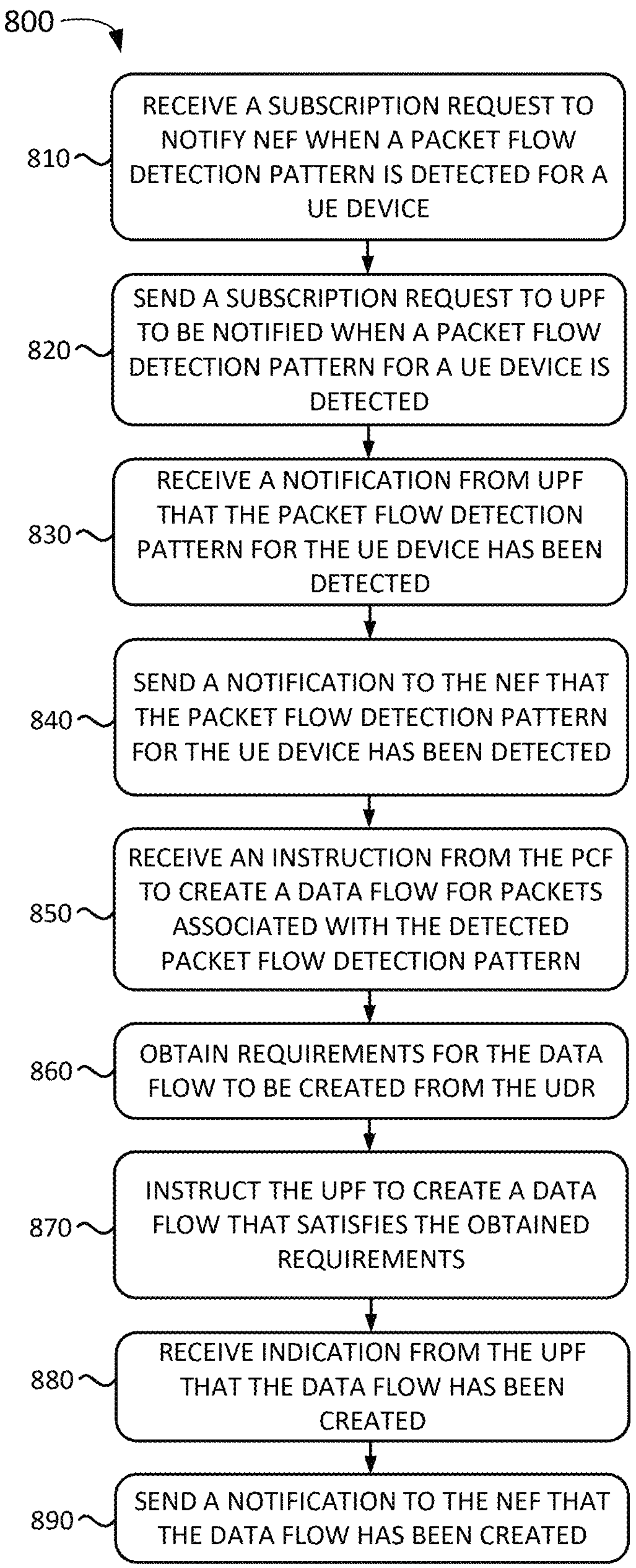
FIG. 8 illustrates a flowchart of a process for creating a data flow with specified requirements according to an implementation described herein.

FIG. 8 illustrates a flowchart of a process 800 for creating a data flow with specified requirements. In some implementations, process 800 of FIG. 8 may be performed by SMF 240. In other implementations, some or all of process 800 may be performed by another device or a group of devices separate from SMF 240.

As shown in FIG. 8, process 800 may include receiving a subscription request to notify a NEF when a PFD pattern is detected for a UE device (block 810) and sending a subscription request to a UPF associated with the UE device to be notified when the PFD pattern is detected for the UE device (block 820). For example, when SMF 240 is establishing a PDU session for UE device 110, SMF 240 may obtain subscription information associated with UE device 110 from UDM 252. UDM 252 may provide information stored in a subscription record for UE device 110 in UDR 250 to SMF 240. The subscription information may include an instruction to monitor packets associated with UE device 110 for a PFD pattern associated with a PFD rule. SMF 240 may subscribe for notifications from UPF 230 if the PFD pattern is detected for UE device 110.

Process 800 may further include receiving a notification from the UPF that the PFD pattern has been detected for the UE device (block 830) and sending a notification to the NEF that the PFD pattern has been detected for the UE device (block 840). For example, SMF 240 may receive a notification from UPF 230 that the PFD pattern has been detected and may, in turn, send a notification to NEF 260 that the PFD pattern has been detected.

Process 800 may further include receiving an instruction from the PCF to create a data flow for the packets associated with the detected PFD pattern (block 850), obtain requirements for the data flow to be created from the UDR (block 860), and instructing the UPF to create a data flow that satisfies the obtained requirements (block 870). For example, SMF 240 may receive an instruction from PCF 254 to create a data flow for UE device 110 with one or more specified parameters and to assign packets associated with the detected PFD pattern to the created data flow. SMF 240 may instruct UPF 230 to create the data flow and to assign packets associated with the detected PFD pattern to the created data flow.

Process 800 may further include receiving an indication from the UPF that the data flow has been created (block 880) and sending a notification to the NEF that the data flow has been created (block 890). For example, SMF 240 may receive an indication from UPF 230 that the data flow has been created for UE device 110 and may a notification to NEF 260 that the data flow has been created. In some implementations, the notification may be sent to PCF 254 and PCF 254 may forward the notification to NEF 260.

Figure 9A:
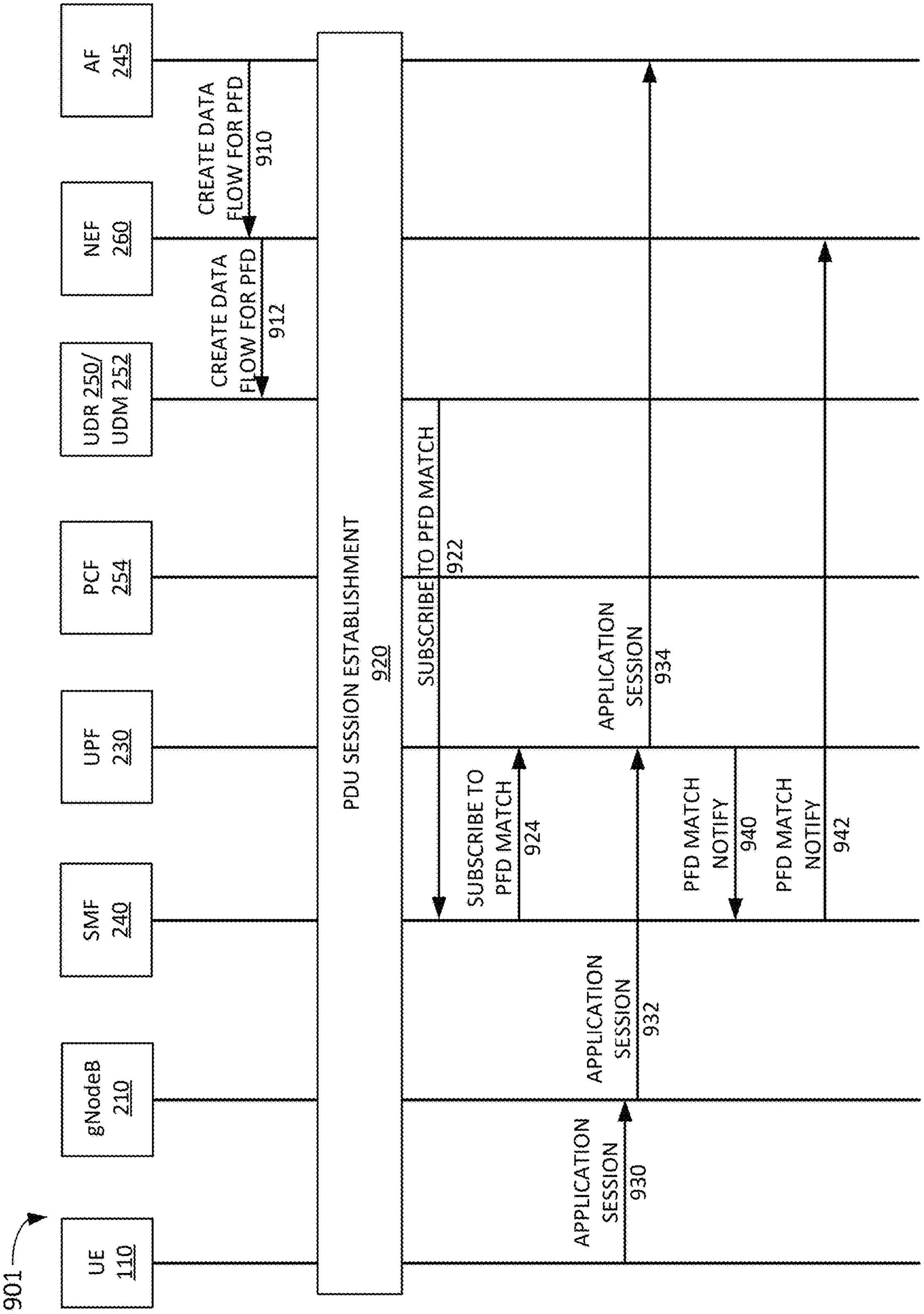
FIGS. 9A and 9B illustrate exemplary signal flow diagrams according to an implementation described herein.
Figure 9B:
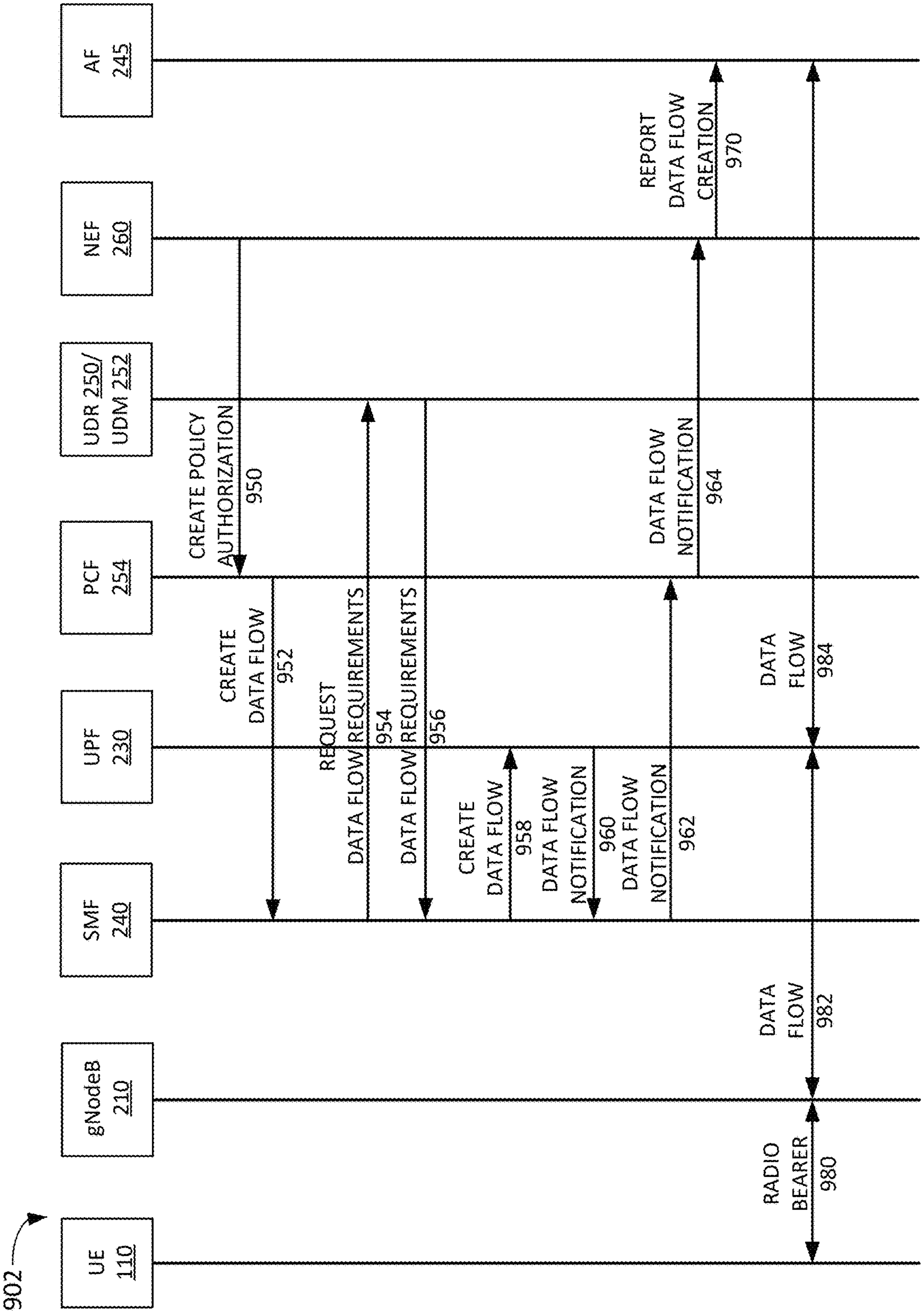

FIGS. 9A and 9B illustrate exemplary signal flow diagrams for implementing a rule to create a data flow with specified requirements and creating the data flow. As shown in FIG. 9A, signal flow 901 may include AF 245 sending a request to NEF 260 to implement a rule to create a data flow with one or more specified requirements if a PFD pattern is detected for UE device 110 (signal 910). The request may include, for example, information identifying a device group of UE devices 110, an application ID corresponding to the PFD pattern, and a 5QI to be assigned to the created data flow. NEF 260 may store information associated with the PFD rule in UDR 250 by sending an instruction to UDM 252 (signal 912). The instruction may include information identifying the device group of UE devices 110, the application ID corresponding to the PFD pattern, and a policy action to create a data flow with the specified 5QI.

UE device 110 may establish a PDU session in core network 150 via gNodeB 210 (block 920). During the PDU session establishment procedure, SMF 240 may obtain subscription information for UE device 110 from PCF 254 and PFC 254 may send an instruction to subscribe to the PFD match to SMF 240 (signal 922). SMF 240 may instruct UPF 230 to subscribe to the PFD match (signal 924). As a result, UPF 230 may monitor packets associated with UE device 110 for the application ID specified in the PFD rule generated by NF 260. In other implementations, NEF 260 may receive the instructions from AF 245 to create the rule after the PDU session has been established and may push the rule to SMF 240 directly without storing the rule in UDR 250. In such implementations, NEF 260 may identify SMF 240 associated with UE device 110 based on information identifying the PDU session received from AF 245 and/or by querying AMF 220 for information identifying SMF 240 based on the PDU session information.

At a later time, UE device 110 may initiate an application session using the application ID with application server 165 (represented as AF 245 in FIG. 9A) via gNodeB 210 and UPF 230 (signals 930, 932, and 934). UPF 230 may detect the application ID and notify SMF 240 (signal 940). In response, SMF 240 may send a notification to NEF 260 that the application ID has been detected for packets associated with UE device 110 (signal 942). The notification may include information identifying UE device 110, the detected application ID, and the PCF ID for PCF 254 associated with the PDU session for UE device 110.

Continuing to FIG. 9B, signal flow 902 includes NEF 260 sending a create policy authorization to PCF 254 associated with the received PCF ID (signal 950). The create policy authorization message may include the UE ID for UE device 110, the application ID, the IP address assigned to UE device 110, and the PCF ID. In response, PCF 254 may send a create data flow message to SMF 240 (signal 952). The create data flow message may include the UE ID for UE device 110 and the application ID. In response, SMF 240 may obtain the data flow requirements from UDR 250 via UDM 252 (signals 954, 956). The obtained data flow requirements may identify the 5QI corresponding to the QoS requirement for the data flow to be created.

SMF 240 may then instruct UPF 230 to create a data flow with the identified 5QI and assign packed associated with the application ID and UE device 110 to the created data flow (signal 958). UPF 230 may create the data flow and send a notification back to SMF 240 that the data flow has been created (signal 960). The notification may include the session ID assigned to the created data flow (e.g., the QoS Flow ID (QFI)). SMF 240 may send a notification that the data flow has been created to NEF 260 via PCF 254 (signals 962 and 964). NEF 260 may then report the data flow creation to AF 245 (signal 970). The report may include the UE ID, the UE IP address, and the session ID for the created data flow. gNodeB 210 may map the created data flow to a radio bearer that satisfies the 5QI requirement. UE device 110 may then continue the application session using the created data flow (signals 980, 982, and 984).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, and a series of signals have been described with respect to FIGS. 9A and 9B, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms “comprises”/“comprising” when used in this specification are taken to specify the presence of stated features, integers, steps or components but does not preclude the presence or addition of one or more other features, integers, steps, components or groups thereof.

The term “logic,” as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term “substantially” is utilized herein to represent the inherent degree of uncertainty that may be attributed to any quantitative comparison, value, measurement, or other representation. The term “substantially” is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

receiving, by a device, a request to implement a rule to create a data flow in a core network for a user equipment (UE) device, wherein the rule specifies that a data flow with a particular requirement is to be created when a particular Packet Flow Detection (PFD) pattern is detected for the UE device;

adding, by the device, the rule to a subscription record associated with the UE device;

receiving, by the device, an indication that the PFD pattern has been detected for the UE device;

sending, by the device, a policy authorization to a Policy Control Function (PCF), associated with the UE device, to create the data flow, in response to receiving the indication that the PFD pattern has been detected for the UE device;

receiving, by the device, a request from an Application Function (AF) to terminate the data flow if a termination criterion is detected; and sending, by the device, an instruction to the PCF to terminate the data flow if the termination criterion is detected, in response to receiving the request from the AF to terminate the data flow if the termination criterion is detected.

2. The method of claim 1, wherein the device implements a Network Exposure Function (NEF) in the core network, and wherein the request to implement the rule to create the data flow is received from the AF.

3. The method of claim 1, wherein the PFD pattern includes an application identifier.

4. The method of claim 1, wherein the rule is associated with a group of UE devices.

5. The method of claim 1, wherein adding the rule to the subscription record associated with the UE device includes:

sending an instruction to a Unified Data Management (UDM) function to add the rule to the subscription record associated with the UE device, wherein the instruction includes an instruction to send a notification to the device when the PFD pattern is detected for the UE device.

6. The method of claim 1, wherein adding the rule to the subscription record associated with the UE device includes:

sending an instruction to a Unified Data Management (UDM) function to add the rule to the subscription record associated with the UE device, wherein the instruction includes an instruction to perform deep packet inspection to identify the PFD pattern.

7. The method of claim 1, wherein the received indication that the PFD pattern has been detected for the UE device includes information identifying the PCF associated with the UE device.

8. The method of claim 1, wherein the request to implement the rule to create the data flow in the core network for the UE device is received from the AF, the method further comprising:

sending a notification to the AF that the data flow has been created for the UE device.

9. The method of claim 1, wherein the particular requirement includes a Quality of Service (QoS) requirement.

10. The method of claim 1, wherein the particular requirement includes a throughput requirement.

11. The method of claim 1, wherein the particular requirement includes routing the data flow to a Multi-access Edge Computing (MEC) network.

12. A device comprising:

a processor configured to:

receive a request to implement a rule to create a data flow in a core network for a user equipment (UE) device, wherein the rule specifies that a data flow with a particular requirement is to be created when a particular Packet Flow Detection (PFD) pattern is detected for the UE device;

add the rule to a subscription record associated with the UE device;

receive an indication that the PFD pattern has been detected for the UE device; and send a policy authorization to a Policy Control Function (PCF), associated with the UE device, to create the data flow, in response to receiving the indication that the PFD pattern has been detected for the UE device;

receive a request from an Application Function (AF) to terminate the data flow if a termination criterion is detected; and send an instruction to the PCF to terminate the data flow if the termination criterion is detected, in response to receiving the request from the AF to terminate the data flow if the termination criterion is detected.

13. The device of claim 12, wherein the device includes a Network Exposure Function (NEF) in the core network, and wherein the request to implement the rule to create the data flow is received from the AF.

14. The device of claim 12, wherein the PFD pattern includes an application identifier, and wherein the rule is associated with a group of UE devices.

15. The device of claim 12, wherein, when adding the rule to the subscription record associated with the UE device, the processor is further configured to:

send an instruction to a Unified Data Management (UDM) function to add the rule to the subscription record associated with the UE device, wherein the instruction includes an instruction to send a notification to the device when the PFD pattern is detected for the UE device.

16. The device of claim 12, wherein the received indication that the PFD pattern has been detected for the UE device includes information identifying the PCF associated with the UE device.

17. The device of claim 12, wherein the request to implement the rule to create the data flow in the core network for the UE device is received from the AF, and wherein the processor is further configured to:

send a notification to the AF that the data flow has been created for the UE device.

18. A non-transitory computer-readable memory device storing instructions executable by a processor, the non-transitory computer-readable memory device comprising:

one or more instructions to receive a request to implement a rule to create a data flow in a core network for a user equipment (UE) device, wherein the rule specifies that a data flow with a particular requirement is to be created when a particular Packet Flow Detection (PFD) pattern is detected for the UE device;

one or more instructions to add the rule to a subscription record associated with the UE device;

one or more instructions to receive an indication that the PFD pattern has been detected for the UE device;

one or more instructions to send a policy authorization to a Policy Control Function (PCF), associated with the UE device, to create the data flow, in response to receiving the indication that the PFD pattern has been detected for the UE device;

one or more instructions to receive a request from an Application Function (AF) to terminate the data flow if a termination criterion is detected; and one or more instructions to send an instruction to the PCF to terminate the data flow if the termination criterion is detected, in response to receiving the request from the AF to terminate the data flow if the termination criterion is detected.

19. The non-transitory computer-readable memory device of claim 18, wherein the one or more instructions to add the rule to the subscription record associated with the UE device include:

one or more instructions to send an instruction to a Unified Data Management (UDM) function to add the rule to the subscription record associated with the UE device, wherein the instruction includes an instruction to perform deep packet inspection to identify the PFD pattern.

20. The non-transitory computer-readable memory device of claim 18, wherein the particular requirement includes routing the data flow to a Multi-access Edge Computing (MEC) network.

* * * * *